UNITED STATES PATENT OFFICE.

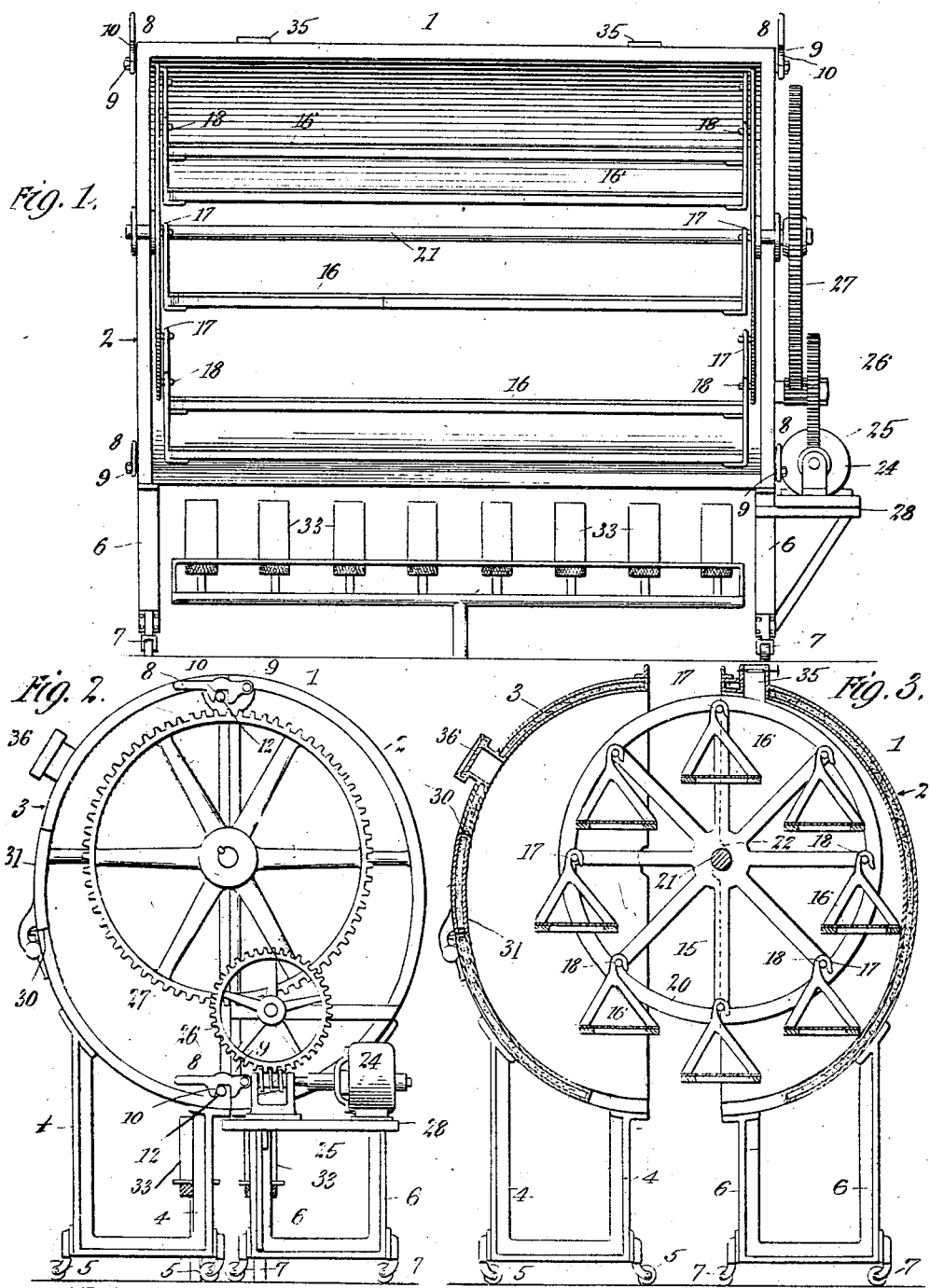

JAMES CLAREY, OF NEW YORK, N. Y.

BAKER'S OVEN.

987,957.  Specification of Letters Patent.  Patented Mar. 28, 1911.

Application filed December 24, 1909. Serial No. 534,867.

*To all whom it may concern:*

Be it known that I, JAMES CLAREY, a citizen of the United States, residing at New York, in the county of New York, borough of Manhattan, and State of New York, have invented certain new and useful Improvements in Bakers' Ovens, of which the following is a full, clear, and exact description.

This invention relates to bakers' ovens of the class making use of a rotatable reel or carrier having loosely depending or swinging shelves upon which the bread or the like to be baked is placed. This carrier rotates in a generally cylindrical shell or drum through which a current of hot air circulates from a burner or stove below. Such current of air, and the general nature of the operation makes frequent cleaning out of the oven both necessary and important, but so far as I am aware no means have hitherto been provided for accomplishing this any more conveniently than poking a brush through openings of the shell or drum. This generally necessitates the further removal of the dust from the stove or burner below.

It is the purpose of my invention to overcome the foregoing difficulty, and further to provide a means for quickly dissipating and cooling the heated atmosphere of the oven if it should happen at any time that the bread was in danger of burning. Sometimes owing to overheating, or inattention, or some failure of the rotative mechanism, the entire contents of the oven often numbering a hundred or more loaves, would be over-baked and injured unless instantly removed from the heated atmosphere. I provide means for readily accomplishing this result.

With the foregoing and other objects in view my invention consists in the features of construction and combination as hereinafter set forth and claimed.

In the drawings, Figure 1 is an elevation with the front half section of the shell removed. Fig. 2 is an end elevation, and Fig. 3 is a transverse sectional view with the half sections partly separated.

Referring to the drawings in which like parts are designated by the same reference sign, 1 denotes the shell or drum which I make in two half sections, comprising a rear half section 2 and a front half section 3, both of which are movable in my preferred construction, although it is only essential that the front section be made movable for the main purpose of the invention. Preferably the front section is made movable in every direction in a horizontal plane, which I accomplish by furnishing it with rigid legs or standards 4 provided with ordinary swiveled casters 5 which will permit a universal movement of the section on any horizontal floor or surface. In the particular construction shown the rear section is similarly provided with legs or standards 6 having similar casters 7 so as to be movable with the front section 3 when desired.

8 denotes latches for securing the front and rear sections together. These latches may be of any desired sort, but I prefer pivoted hooks 9 having inclined surfaces 10 which may be jammed down tight over pins 12 fixed to the other half section, thus drawing the two half sections together with great force or pressure. These hooks are capable of being easily and quickly lifted for the purpose of drawing the two shell half sections apart from one another, and when constructed as shown, with the pins 12 on the front half section, present the special advantage of being capable of acting like a hinge at one end of the shell or drum, permitting the latter to swing open exclusively from the other end. This permits an instant opening up of the shell or drum, when required.

15 denotes broadly the reel or carrier having dependent swinging shelves 16. I make the latter with triangular end portions having open hooks 17 at their upper corners adapted to swing over and pivot on fixed pins 18 projecting inward from the end wheels 20 of the reel. The reel has a central shaft or axle 21 journaled in bearings 22 in the rear half shell section. Also forming part of this rear half shell section I provide a motor 24 of any desired sort, driving the reel 15 through the worm and gear train 25, 26 and 27. This motor is conveniently supported on a shelf or bracket 28 from the rear half shell section 2.

30 denotes a comparatively long narrow opening in the front shell half section 3, this opening being of such size and proportions as to permit bread to be removed from the shelves 16, individually as they pass the same. 31 denotes a door swinging upward into a position to close the said opening 30. This door alone is employed for access in supplying and removing bread from the shelves in the normal ordinary action of the machine.

33 designates burners, which in accordance with my invention are not attached in any way to the shell half sections, but are independently supported on the floor of the building at such an elevation as to be disposed directly between and beneath the shell half sections, the latter being formed to provide an opening at this point through which the heated gases may pass upward. At the top of the shell or drum, and preferably in the rear half section thereof, I provide vent openings 35 having dampers, if desired, by which the upward current of hot gases through the drum is maintained and regulated.

36 denotes a window in the front half section through which the progress of the baking is constantly observable.

An incidental feature of the invention consists in the removability of the reel 15 the axle 21 of which is merely received in notches in the rear shell half section constituting the bearings 22. By this means the reel is removable by merely lifting it up out of these notches.

The use of the invention will be obvious from the foregoing description. The reel or carrier 16 rotates slowly in the heated atmosphere of the oven, and the bread, placed in rows on the shelves 16 as the latter successively pass the opening 30, is baked by repeated turns of the reel over the burners, after which the shelves may again be brought successively opposite the opening 30 for removal of the bread. Should the bread be in danger of burning, or any accident occur to imperil the loaves within the oven, the front half section 3 is capable of being quickly swung away to dissipate the heated atmosphere of the oven, and instantly cool its whole interior. In like manner the oven is capable of being cleaned whenever required, and may be rolled away, either in part or as a whole from over the burners 33, either for the purpose of its own cleaning and dusting, or for the purpose of cleaning and dusting the burners.

What I claim, is:

1. In a baker's oven, the combination with a shell half section having a reel journaled therein, dependent shelves on said reel, a relatively shiftable shell half section adapted to be associated with said first shell half section to form a heating chamber and to inclose said reel, means carried by one of said shell-sections to permit it to travel toward and away from the other section to associate and dissociate the two sections, and means for positioning said movable half section into and out of register with the other.

2. In a baker's oven, the combination with a shell half section having a reel journaled therein, dependent shelves on said reel, a relatively shiftable shell half section adapted to be associated with said first shell half section to form a heating chamber wherein said reel is inclosed, means carried by one of said shell-sections to permit it to travel toward and away from the other to associate the sections whereby said chamber is formed and to dissociate the sections, a door in said movable half section through which access can be had to the shelves successively, and means for positioning said movable half section into and out of register with the other.

3. In a baker's oven, the combination with a shell half section having a reel journaled therein, shelves carried by said reel, a relatively shiftable second shell half section adapted to be associated with the first to inclose said reel and to form a heating chamber and housing for the reel and shelves, means associated with the shell-sections for permitting relative movement in any horizontal direction between said half sections, and means for clasping said sections together to inclose said reel.

4. In a baker's oven, the combination with a shell half section having a reel journaled therein, shelves carried by said reel, a relatively shiftable second shell half section adapted to be associated with the first to inclose said reel, said shell-sections forming when in direct association a heating chamber and a housing for the reel and shelves, means for permitting independent movement of each of said sections in any horizontal direction, and means for clasping said sections together to inclose said reel.

5. In a baker's oven, the combination with a shell half section having a reel journaled therein, shelves carried by said reel, a relatively shiftable second shell half section adapted to be associated with the first to form a heating chamber and a housing for said reel, one of said sections having a traveling movement relatively to the other whereby said chamber sections may be separated to permit escape of the heating medium, means for positioning said sections into register with one another, and means including a latch for clasping them together in such engagement.

6. In a baker's oven, the combination with a shell half section having a reel journaled therein, shelves carried by said reel, a relatively shiftable second shell half section adapted to be associated with the first to form a heating chamber and a housing for said reel, one of said sections having a traveling movement relatively to the other whereby said chamber sections may be separated to permit escape of the heating medium, and latches having inclined portions for drawing together said sections and clasping them in such engagement.

7. In a baker's oven, the combination with a shell half section having a reel journaled therein, shelves carried by said reel, a relatively shiftable second shell half section adapted to be associated with the first to form a heating chamber and a housing for said reel, one of said sections having a traveling movement relatively to and in the same horizontal plane as said other section whereby said chamber-sections may be separated to permit escape of the heating medium in a vertical direction relatively to the plane of travel of said movable section, a door in said second section, and means wholly carried by said first section for rotating the reel.

8. In a baker's oven, the combination with a plurality of shell-sections adapted to be associated with one another to form a heating chamber and a housing, a reel-device mounted on one of said sections, a plurality of pendant shelves carried by said reel, and hinge-members carried by said sections and adapted to permit a tilting movement of the sections relatively, whereby said sections, when associated throughout their extent, constitute said heating chamber and, when tilted, permit escapement of the heating medium from the chamber.

9. In a baker's oven, a plurality of separable and tiltable sections hingedly connected to each other and adapted to have a plurality of relative movements, a reel removably journaled in one of said sections, and means for clasping said sections together.

10. In a baker's oven, a plurality of shell-sections adapted to be associated with one another to form a chamber, one of said sections being adapted to travel in a horizontal plane relatively to another, whereby said sections may be separated to permit escape of the heating medium from said chamber in a relatively vertical direction, a shelf-carrying member mounted in one of said sections, and means for retaining said sections in associated relation.

11. In a baker's oven, a plurality of shell-sections adapted to be associated with one another to form a chamber, one of said sections being adapted to travel in a horizontal plane relatively to another, whereby said sections may be separated to permit escape of the heating medium from said chamber in a relatively vertical direction, a rotating shelf-carrying member mounted in one of said sections, and means for retaining said sections in associated relation.

12. In a baker's oven, a plurality of shell-sections adapted to be associated with one another to form a chamber, one of said sections being adapted to travel in a horizontal plane relatively to another, whereby said sections may be separated to permit escape of the heating medium from said chamber in a relatively vertical direction, a rotating shelf-carrying member mounted in one of said sections, means for retaining said sections in associated relation, and means for rotating said shelf-carrying member.

13. In a baker's oven, a plurality of shell-sections adapted to be associated with one another to form a chamber, one of said sections being adapted to travel in a horizontal plane relatively to another, whereby said sections may be separated to permit escape of the heating-medium from said chamber in a relatively vertical direction, a rotating shelf-carrying member mounted in one of said sections, means for retaining said sections in associated relation, means for rotating said shelf-carrying member, and a heat-producing device underlying said shell-sections.

14. In a baker's oven, a plurality of shell-sections adapted to be operatively associated with one another to form a heating chamber and a housing, a heat-producing device underlying said chamber, means movable in a substantially horizontal plane whereby a section may be positioned toward and away from said heating device, and a shelf-carrying member rotatably mounted within said chamber.

In witness whereof, I subscribe my signature, in the presence of two witnesses.

JAMES CLAREY.

Witnesses:
 WALDO M. CHAPIN,
 WILLIAM C. LARY.